Feb. 11, 1936. E. POEGGEL 2,030,225
MEANS FOR CUTTING, SETTING AND SHARPENING CIRCULAR SAWS
Filed July 2, 1934 5 Sheets-Sheet 1

INVENTOR.
ERICH POEGGEL
BY Richards & Geier
ATTORNEYS.

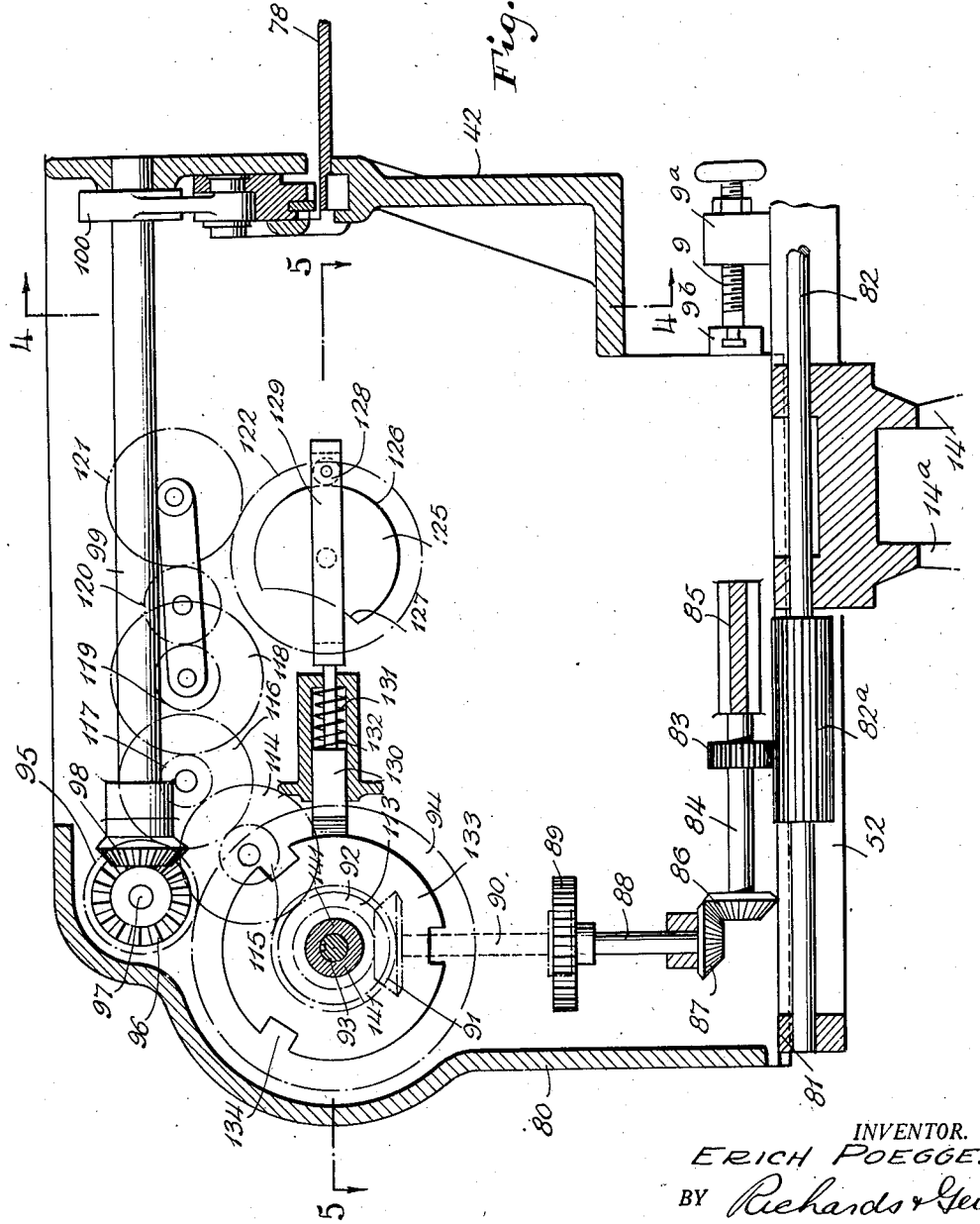

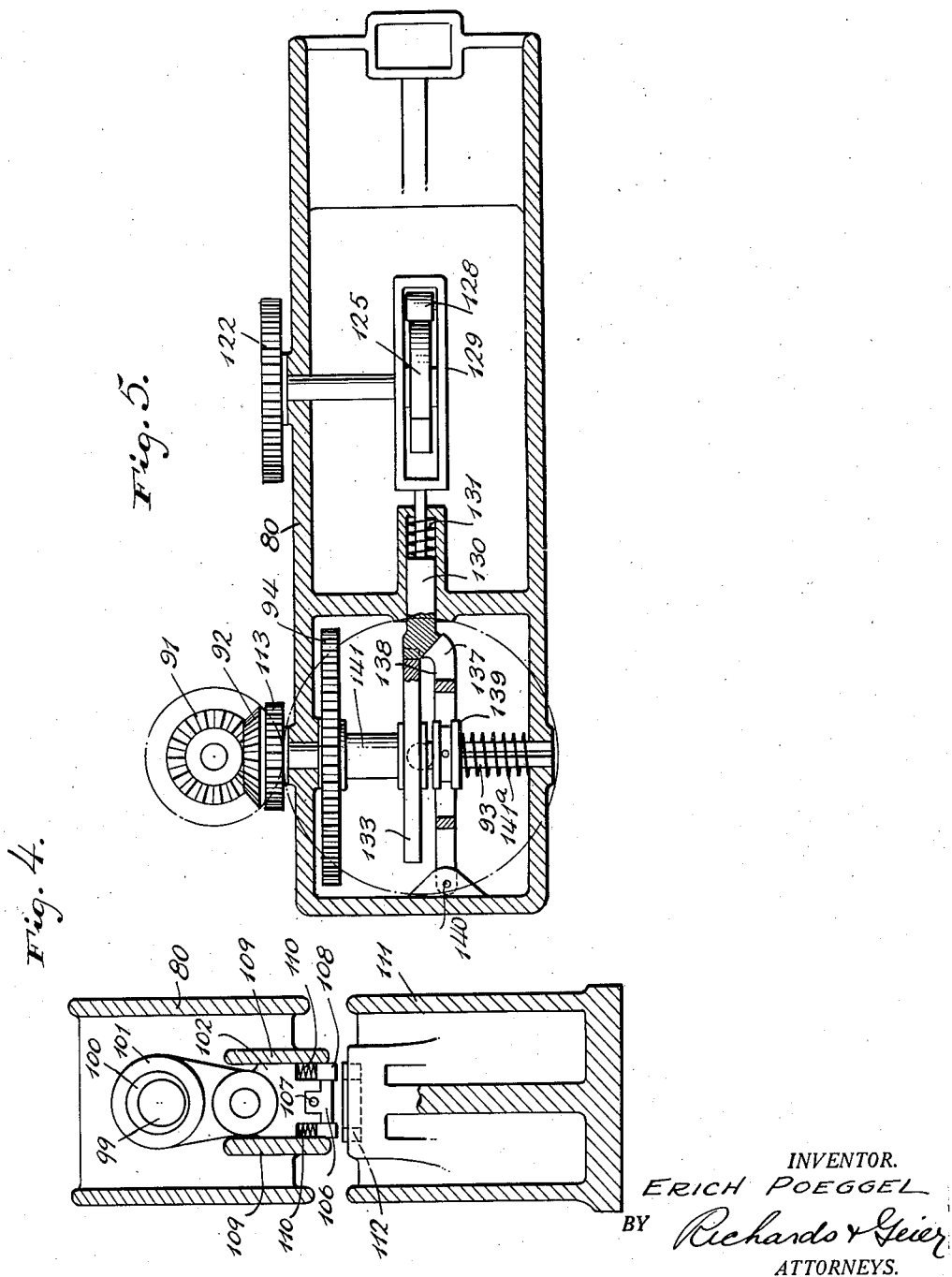

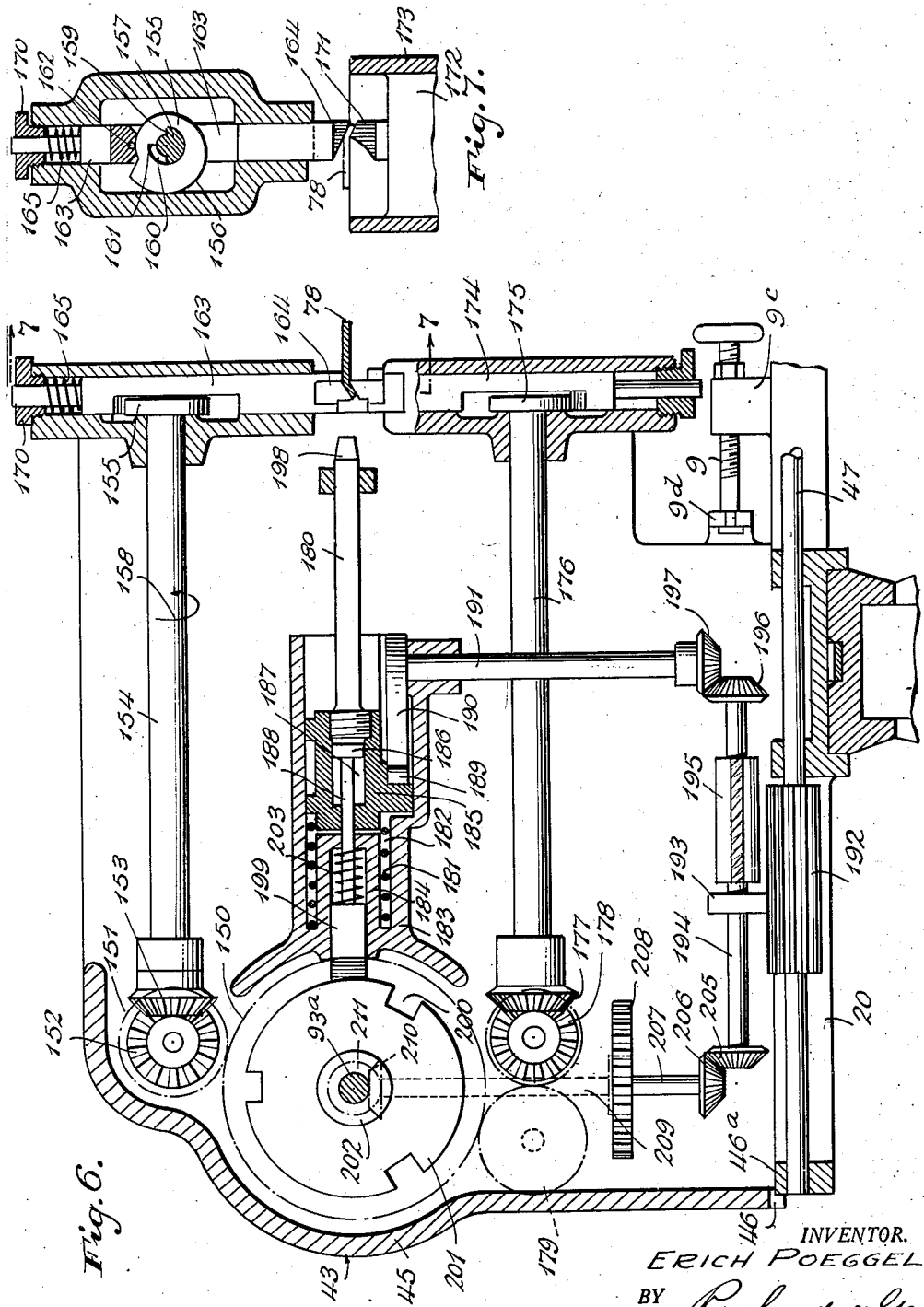

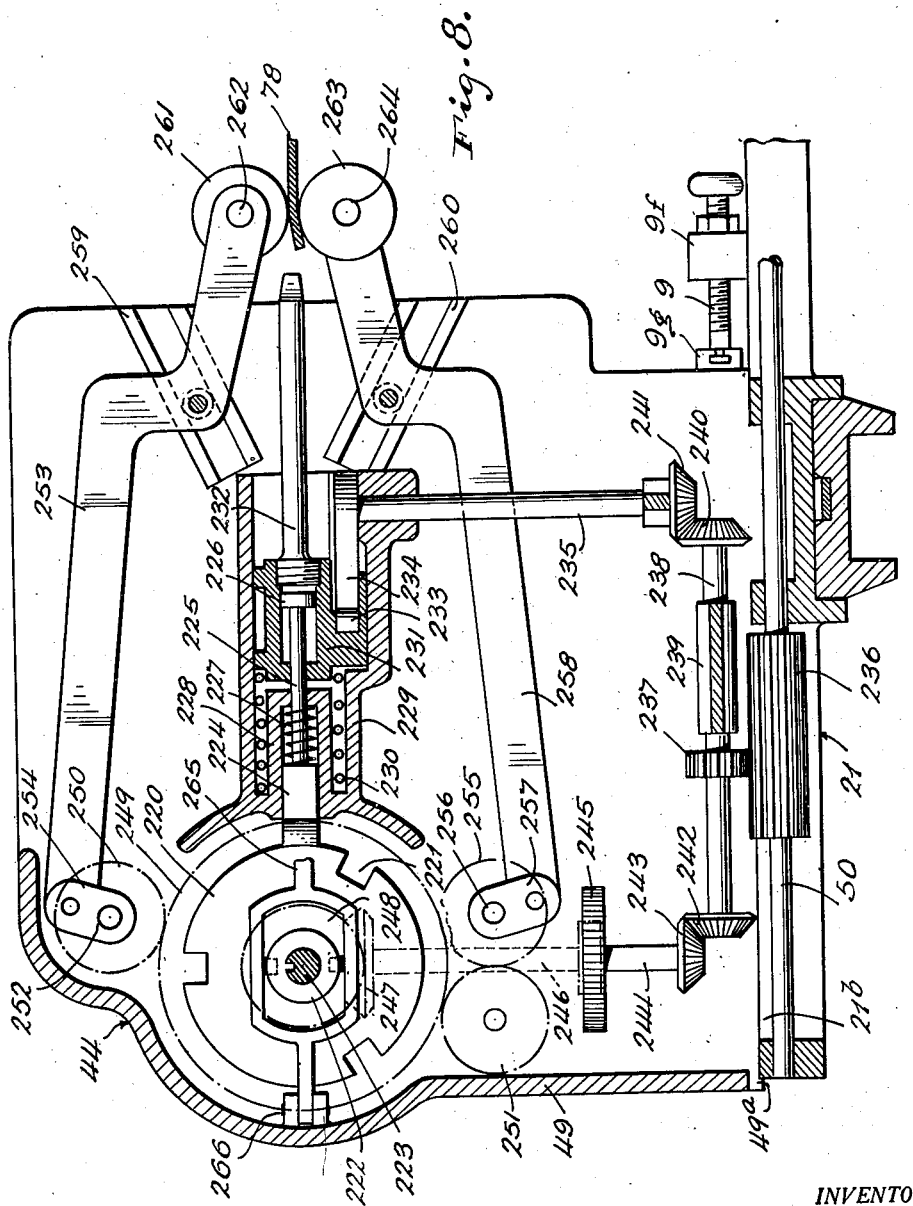

Patented Feb. 11, 1936

2,030,225

UNITED STATES PATENT OFFICE 2,030,225

MEANS FOR CUTTING, SETTING, AND SHARPENING CIRCULAR SAWS

Erich Poeggel, Remscheid, Germany

Application July 2, 1934, Serial No. 733,409

11 Claims. (Cl. 76—25)

This invention relates to means for cutting, setting and sharpening circular saws.

The present application is a continuation in part of my co-pending patent application relating to Cutting, setting and sharpening saws, Serial No. 552,702, filed July 23, 1931 now Patent Number 1,968,352.

An object of the present invention is the provision of a single machine by means of which the cutting, setting and sharpening of circular saws may be carried out automatically and in rapid succession.

Another object is the provision of a machine by means of which various teeth of a single circular saw may be cut, set and sharpened automatically, thus eliminating the necessity of employing skilled labor in the manufacture of circular saws.

The above and other objects of this invention may be realized through the provision of a single machine comprising an intermittently rotated central support which is connected by radial guides with cutting, setting and sharpening devices situated around said support and movable radially with respect thereto, the setting and sharpening devices being movable around said central support in relation to the cutting device.

The invention will appear more clearly from the following detailed description when taken in connection with the accompanying drawings showing a preferred embodiment of the inventive idea.

In the drawings:

Figure 3 shows the cutting device in vertical section.

Figure 4 is a vertical section along the line 4—4 of Figure 3.

Figure 5 is a horizontal section along the line 5—5 of Figure 3.

Figure 6 shows the setting device in section.

Figure 7 is a vertical section along the line 7—7 of Figure 6.

Figure 8 shows the sharpening device in section.

Figure 2:
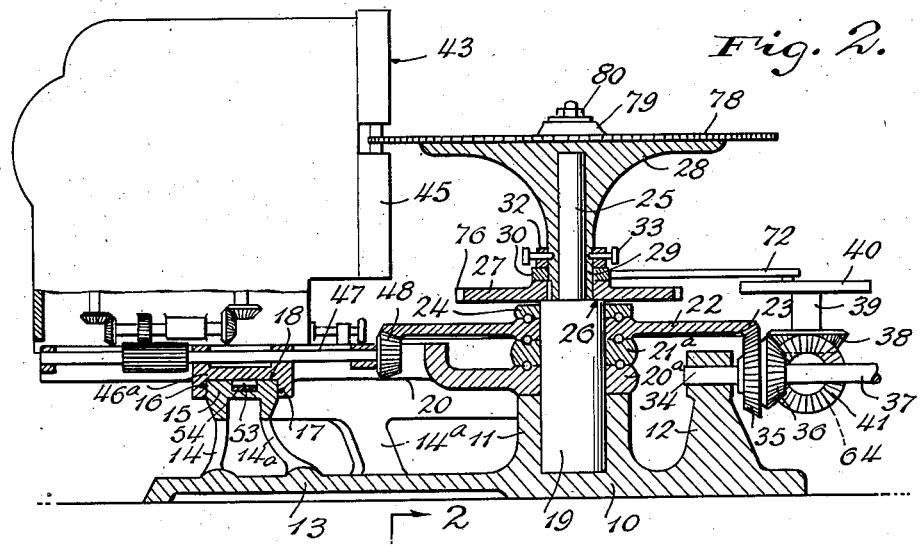
Figure 2 is a vertical section along the line 2—2 of Figure 1.

The machine illustrated in the drawings is carried by a base 10 comprising a hollow central support 11, a shaft bearing 12 and a supporting web 13.

The web 13 carries three pairs of vertical supports 14 and 14a, one of which is shown in section in Figure 2 of the drawings. The supports 14 and 14a carry an annular guide 15 and may be cast of one piece with the web 13 and the guide 15.

As shown more clearly in Fig. 2 the circular guide 15 is provided with an outer side surface 16, an inner side surface 17 and upper surfaces 18 along which the setting device 43 and the sharpening device 44 may be moved.

A vertical spindle 19 is situated within the hollow support 11. A radial track 20 which carries the setting device 43 comprises an annular portion 20a which is placed horizontally on top of the support 11. Another radial track 21 which carries the sharpening device 44 comprises an annular portion 21a which is situated on top of the annulus 20a and carries a wheel 22 having a considerably larger diameter than the support 11 and provided with teeth 23. Another annular member 24 is situated on top of the wheel 22.

The spindle 19 passes through central openings formed in the members 20a, 21a, 22 and 24 and is cast of a single piece with a vertical rod 25, which has a considerably smaller diameter than the spindle 19, so that an annular flange 26 is formed between the side surfaces of the rod 25 and the spindle 19.

A toothed wheel 27 is carried by the flange 26. A hollow support 28 fits on top of the vertical rod 25 and is also carried by the flange 26. The upper portion of the support 28 has a much larger outer diameter than its tubular lower portion 29, as shown in Figure 2. The tubular portion 29 of the support 28 fits into the central opening of the toothed wheel 27, so that the toothed wheel 27 surrounds the tube 29 as well as the rod 25.

A hub 30, which is placed upon the wheel 27 also surrounds the tubular portion 29 and the rod 25. The hub 30 is cast of a single piece with a lever 31 which is shown in top view in Figure 1 of the drawings. Another ring 32 is situated on top of the ring 30 and carries bolts 33 which establish a permanent connection between the ring 32 and the tubular portion 29 of the support 28.

The support 12 carries a shaft 34 which is rotatably mounted in said support and which is rigidly connected with a bevel wheel 35 meshing with the teeth 23 of the wheel 22. The wheel 35 is firmly connected with another bevel wheel 36 which is keyed upon a shaft 37.

The shaft 37 is carried by a bearing 62 and is driven by a motor 61. The bevel wheel 38 meshes with a bevel wheel 41 keyed upon a horizontal shaft 42 which is carried by a bearing 63. The shaft 42 is rigidly connected with a bevel wheel 55

64 which meshes with a bevel wheel 38 keyed upon a vertical shaft 39 which is firmly connected with a horizontal disc 40, shown in top view in Figure 2 of the drawings.

The cutting device 42, the setting device 43 and the sharpening device 44 are situated around the central support 28. The cutting device 42 is rigidly connected with one end of the annular guide 15, while the setting device 43 and the sharpening device 44 are slidably mounted upon radial tracks 20 and 21, respectively, which are rotatable around the spindle 19 and are mounted upon the annular guide 15.

The setting device 43 shown in sections in Figures 2, 6 and 7 comprises a casing 45 having lower guide portions 46, which are slidable along the guides 46a forming a part of the radial track 20. The track 20 carries a shaft 47, which is rotatably mounted in the track and which is firmly connected with a bevel wheel 48 (Fig. 2) meshing with the teeth 23 of the toothed wheel 22.

The sharpening device 44 shown in section in Figure 8 comprises a casing 49, which comprises lower guiding members 49a slidable along guides 21b of the radial track 21. The track 21 carries a shaft 50 provided with a bevel wheel 51, (Fig. 1) which also meshes with teeth 23 of the toothed wheel 22. The sharpening device 44 is movable around the spindle 19 and in a direction toward and away from the spindle in substantially the same manner as the setting device 43.

The cutting device 42 is movable only in the direction toward and away from the spindle 19 and is carried by a track 52 which is rigidly connected with the guide 15.

The guide 15 comprises a groove 53 which extends along the entire length of the guide 15 and the bottom of which is provided with teeth 54.

Figure 1:
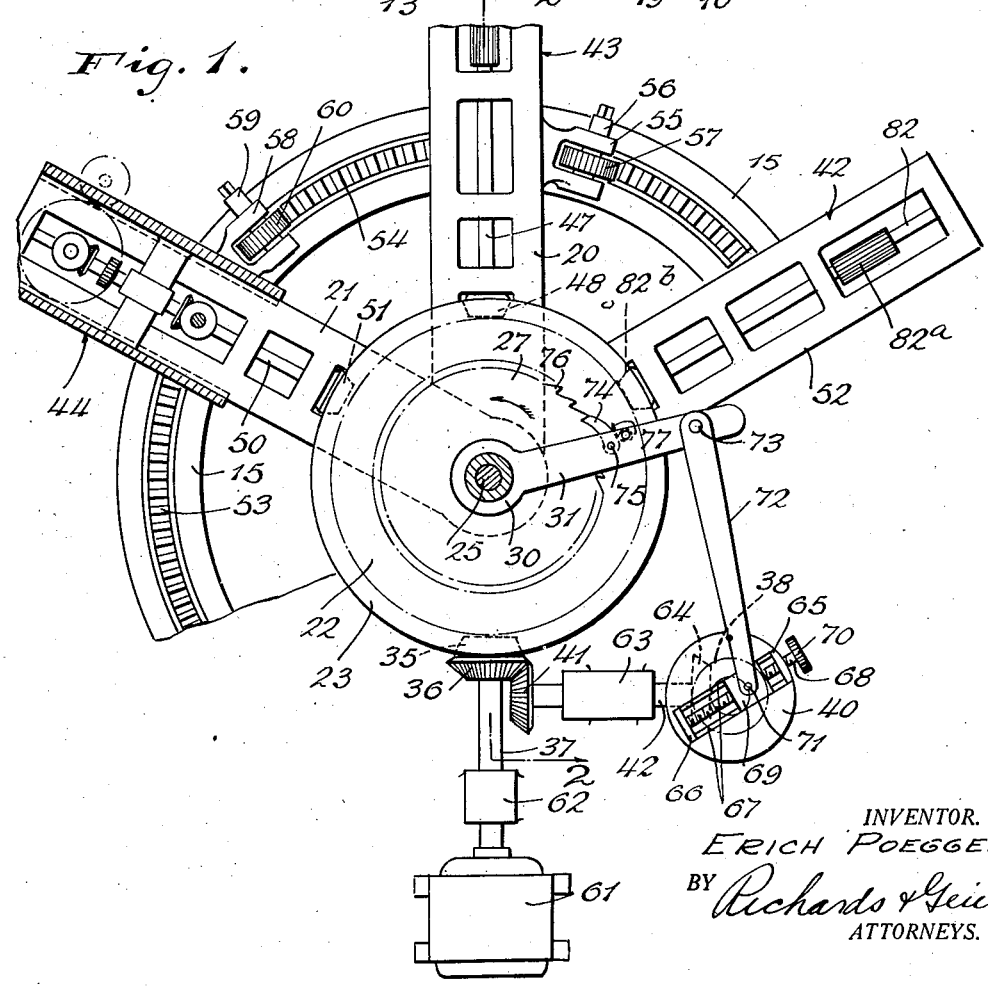
Figure 1 is a plan view of the machine for machine for manufacturing circular saw blades constructed in accordance with the principles of the present invention.

As shown in Figure 1, the track 20 is cast of a single piece with the bearing 55 which carries a shaft 56. A gear wheel 57 is keyed upon the shaft 56 and meshes with the teeth 54 situated at the bottom of the groove 53. The shaft 56 may be rotated by hand or by any suitable motor not shown in the drawings. When the shaft 56 is rotated, it causes the rotation of the gear 57 meshing with the teeth 54 with the result that the entire radial track 20 carrying the setting device 43 is moved circumferentially around the central support 28 thus shifting the position of the setting device 43 with respect to the cutting device 42 and sharpening device 44.

The radial track 21 which carries the sharpening device 44 is rigidly connected with a similar bearing 58 carrying a shaft 59. A gear 60 keyed upon the shaft 59 meshes with the teeth 54 of the gooove 53. When the wheel 58 is rotated by any manual or mechanical means, it will shift the position of the track 21 carrying the sharpening device 44 with respect to the cutting device 42 and the setting device 43.

As shown in Figure 1, the machine is driven by a motor 61 driving the shaft 37 which is supported by the bearing 62. When the shaft 37 is rotated by the motor 61, it will drive the two bevel wheels 36 and 35 which are rigidly connected with the shaft 37.

Since the bevel wheel 36 meshes with the bevel wheel 41 the latter will be rotated along with its shaft 42, which is carried by a bearing 63. The bevel wheel 64 which is rigidly connected with the shaft 42, will rotate along with this shaft and will drive the bevel wheel 38, keyed upon the shaft 39.

Since the disc 40 is rigidly connected with the shaft 39, the disc 40 will be rotated by said shaft. As shown in Figure 1 of the drawings, the disc 40 is provided with a pair of supports 65 and 66 and guides 67 situated on top of the disc 40. A threaded bolt 68 is rotatably mounted in the supports 65 and 66 and carries a slide 69. When the handle 70 of the bolt 68 is rotated, the slide 69 is moved along the guides 67 thus shifting the position of the pivot 71 carried by the slide 69.

One end of a link 72 is carried by the pivot 71. The opposite end of the link 72 is connected by a pivot 73 with a lever 31. Due to the provision of the link 72, the rotation of the disc 40 is changed to an oscillatory motion of the lever 31 around the rod 25.

The lever 31 carries a pawl 74 which is suspended by the pivot 75 from the lower surface of the lever 31. The pawl 74 meshes with the teeth 76 of the toothed wheel 27, which is keyed to the sleeve 29 forming a part of the support 28.

As has been mentioned already, the lever 31 is oscillated around the rod 25 by the rotation of the disc 40. During the forward motion of the lever 31, the pawl 74 engages one of the teeth 76 of the wheel 27 and turns the wheel in the direction shown by an arrow in Figure 1. During the return movement of the lever 31 in the opposite direction, the pawl 74 slides over the teeth 76 with the result that the wheel 27 does not move. During the next forward movement of the lever 31 in the direction shown by the arrow, the pawl 74 again moves into engagement with another one of the teeth 76 with the result that the wheel 27 is again moved in the same direction. The pawl 74 is pressed against the teeth 76 by a spring 77 which is carried by the lever 31.

Due to this arrangement, the oscillatory movement of the lever 31 is changed into an intermittent rotation of the wheel 27 in the same direction. Since the wheel 27 is keyed to the sleeve 29 forming a part of the support 28 and since the ring 32 shown in Figure 2, is connected by bolts 33 to the sleeve 29, the toothed wheel 27, the ring 32 and the support 28 will rotate intermittently in the same direction.

A circular saw 78 is placed upon the support 28 and is firmly attached to this support by means of a disc 79 and a screw 80. Due to this arrangement, the circular saw 78 is intermittently rotated along with the support 28 in the same direction.

The time during which the saw 78 is rotated and the intervals during which it is at a standstill, as well as the speed of rotation of the saw, must be selected in such manner that the time during which the saw is at a standstill is sufficient to permit the cutting, setting and sharpening devices 42, 43 and 44 to perform their work upon the teeth of the circular saw. Furthermore, the speed and the time of rotation of the circular saw 78 must be such that during each period of motion the saw is moved either one pitch or a double pitch depending as to whether the cutting, setting and sharpening devices operate upon one tooth or two teeth of the saw at a time. The movement of the saw may be changed by using different toothed wheels 27 and/or by changing the amplitude of oscillation of the lever 31 by adjusting the position of the pivot 71 upon the disc 40 through the manipulation of the bolt 68.

The casing 80 of the teeth cutting device 42 may be moved radially along the guides 81 of the track 52 through the provision of a threaded bolt 9 carried by a support 9a forming a part of the track 52. An end of the bolt 9 engages a member 9b forming a part of the casing 80 (Fig. 3).

The casing 45 of the teeth setting device 43 may be moved radially along the guides 46a of the track 20 by a similar device comprising a threaded bolt 9 which is carried by a support 9c forming a part of the track 20, and which engages a member 9d forming a part of the casing 45 (Fig. 6).

The casing 49 of the teeth sharpening device 44 is moved radially along the guides 49a of the track 21 by a similar device comprising a threaded bolt 9 which is carried by a support 9f forming a part of the track 21, and which engages a member 9g forming a part of the casing 49 (Fig. 8).

The device 42 for cutting teeth is illustrated in Figs. 3, 4 and 5 of the drawings. The device is enclosed in a casing 80, which is slidably mounted upon the guides 81 of the radial track 52.

The track 52 carries a shaft 82 which is rotated by the toothed wheel 22 meshing with the bevel wheel 82b which is rigidly attached to one end of the shaft 82, as shown in Fig. 1 of the drawings.

The shaft 82 is rotatably mounted in bearings forming a part of the track 52.

The shaft 82 carries a toothed sleeve 82a which meshes with a toothed wheel 83. The sleeve 82a which is keyed upon the shaft 82 is sufficiently long to remain in contact with the wheel 83 in spite of the movements of the casing 80 in the radial direction, caused by the rotation of the bolt 9.

The toothed wheel 83 is keyed upon a shaft 84 carried by bearings 85 forming a part of the casing 80. A bevel wheel 86 is rigidly connected with the shaft 84 and meshes with a bevel wheel 87 which is carried by a vertical shaft 88. The opposite end of the shaft 88 carries a coupling 89 which is used to connect the shaft 88 with a shaft 90.

The shaft 90 carries a bevel wheel 91 which meshes with another bevel wheel 92 keyed upon a horizontal shaft 93. A toothed wheel 94 is loosely mounted on the shaft 93 but may be operatively connected with said shaft, as will be described hereinafter.

The wheel 94 drives a toothed wheel 95. The wheel 95 and a bevelled wheel 96 are keyed upon a shaft 97 which is rotatably mounted in the casing 80. The bevelled wheel 96 meshes with a bevelled wheel 98 which is rigidly connected with the horizontal shaft 99. The rotation of the shaft 99 is transmitted to the cam 100, which is shown in front elevation in Fig. 4 of the drawings.

As shown in Fig. 4, the cam 100 which is keyed upon the shaft 99 is surrounded by an eccentric 101, which is cast of a single piece with a punch 102. Due to this arrangement, the rotation of the shaft 99 is transformed into a vertical reciprocal movement of the punch 102.

The punch 102 carries a cutter 106 which is connected with the punch by a pin 107. The punch 102 is connected by means of springs 110, with a pair of holders 108, so that the up and down movement of the cutter 102 is transmitted to the cutter 106 and the holders 108. Due to the fact that the cutter 106 and the holders 108 are detachably connected with the punch 102,
they can be easily removed and replaced by other parts should that become necessary.

The punch 102 is guided by a pair of guides 109 which form a part of the casing 80.

Due to the provision of the springs 110 the holders 108 can come in contact with the saw 78 and can hold it while the cutter 106 is pressed against the saw 78, to cut the teeth of the saw.

A support 111 is situated under the punch 102 and is provided with a removable and replaceable counter cutter or die 112.

The punch 102 is adapted to make two saw teeth during one revolution of the shaft 99. The gear transmission is preferably such that the shaft 99 rotates three times as fast as the shaft 93 or as quickly as the shaft 82.

The teeth cutting device 42 is provided with an automatic locking device which is used to prevent a further cutting of teeth, but which does not prevent the saw 78 from continuing its rotation. This locking device is operable when it is desired to manufacture a round saw having straight edge portions, as well as toothed portions, i. e., a round saw only a part of the circumference of which is provided with teeth.

This locking device comprises a toothed wheel 113 which is carried by the shaft 93 but which is situated outside of the casing 80. The wheel 113 drives a toothed wheel 114 which is firmly connected with a toothed wheel 115. The toothed wheel 115 meshes with the toothed wheel 116 which is rigidly connected with the toothed wheel 117. The toothed wheel 117 meshes with a toothed wheel 118 which is rotatable along with a toothed wheel 119 meshing with a toothed wheel 120. The toothed wheel 120 meshes with a toothed wheel 121 which drives a toothed wheel 122. The wheels 114 to 122 are preferably of such dimensions that during one-third of the complete revolution of the shaft 93 or during one complete revolution of the shaft 99, the wheel 122 turns a distance corresponding to the pitch of its teeth. The number of teeth of the toothed wheel 122 may be equal to one-half the number of the teeth of the saw blade. Then the wheel 122 will complete one revolution when one saw blade has passed through the cutting device 42, since the punch 102 makes two teeth during one revolution of the shaft 99.

A cam disc 125 provided with a cam surface 126 and a gap 127 is firmly connected with the wheel 122 and is rotated thereby. The length of the circumference of the cam surface 126 corresponds to the total length of the teeth of a saw blade, while the length of the gap 127 corresponds to the length of that portion of the circumference of the saw which is to have straight edges.

A roller 128 is carried by a rod 129. A coiled spring 131 surrounds a rod 132, one end of which is rigidly connected with a pawl 130, while the other end is rigidly connected with the rod 129. The spring 131 presses the pawl 130 against the circumference of a wheel 133 and at the same time presses the roller 128 against the cam disc 125.

When the device begins its operations, the cam disc 125 is preferably placed in such a way that the middle of the gap 127 is situated under the roller 128. At the same time one of the notches 134 of the wheel 133 is situated opposite the pawl 130 which is pressed into that notch by means of the spring 131.

As shown in Figure 5, a part of the pawl 130 has the shape of an abutment which is adapted to come in contact with a correspondingly shaped end 137 of a lever 138 carrying a clutch 139 and pivoted at 140 to the casing 80. Consequently, when the pawl 130 is situated in one of the notches 134 of the wheel 133, it presses the lever 138 downward (looking in the direction of Figure 5) against the action of the spring 141a and keeps the clutch 139 open, thus interrupting a connection between the wheel 133 and the shaft 93.

The wheel 133 is keyed to the sleeve 141 which is mounted on the shaft 93 and slidable on said shaft. The wheel 94 is also keyed to the sleeve 141, so that it can rotate only together with the wheel 133. Therefore, when the pawl 130 locks the wheel 133, the toothed wheel 94 is also prevented from rotating.

Due to this arrangement, while the wheel 133 is locked by the pawl 130, the shaft 93 continues to rotate, this rotation being transmitted to the wheel 113 keyed to said shaft and consequently to the cam disc 125 through the gear wheels 114 to 122. (Fig. 3). On the other hand, the shaft 99 which is driven by the wheel 94 is prevented from rotating because the wheel 94 is locked together with the wheel 133. Consequently, the saw will be moved through the device without coming in contact with the punch 102, and the cam disc 125 will be rotated until the cam surface 126 comes in contact with the roller 128. Then due to the pressure of the cam surface 126 the roller 128 will be moved from left to right (looking in the direction of Figure 3), and consequently the rod 129 carrying this roller will be moved in the same direction and will pull the pawl 130 out of the notch 134 against the action of the spring 131.

At the same time the lever 138 will be able to move upwards (looking in the direction of Figure 5) due to the action of the spring 141a, and the clutch 139 carried by the lever 138 will connect the shaft 93 with the wheels 133 and 94.

The toothed wheel 94 will be rotated by the shaft 93, will operate the punch 102 and will rotate the wheel 133 until the cam surface 126 leaves the roller 128 which again comes in contact with the gap 127 of the cam disc 125. At the same time the next notch 134 will come in front of the pawl 130. The spring 131 will press the pawl 130 into this notch so that the wheel 133 and 94 will be locked again, and the coupling 139 (Fig. 5) will be released again.

The locking device interrupts, therefore, the operative connection between the punch 102 and the shaft 93 while that portion of the saw which is to have no teeth passes under the punch 102.

Obviously, the movements of the punch 102 and of the support 28 must be timed in such a way that the punch 102 does not come in contact with the saw 78 during the intermittent movement of the saw.

Due to the described arrangement, the length and the number of teeth of the saw blade and the length of those portions of the saw which are to be free of teeth are automatically determined by the machine.

The setting device 43 shown in cross section in Fig. 6 of the drawings comprises a toothed wheel 150, carried by the shaft 93a, and meshing with the toothed wheel 151.

The wheel 151 is firmly connected with a bevel wheel 152 which drives the bevel wheel 153 firmly connected with a shaft 154. The end portion 157 of the shaft 154 carries a cam disc 155 (Fig. 7) having a gradually rising cam surface 156 which has an abrupt incline from the highest to the lowest point.

The end portion 157 fits into an opening formed in the cam disc 155. As shown in Fig. 7, the end portion 157 does not fill the entire opening. If the shaft 154 is rotated in the direction of the arrow 158 shown in Fig. 6, the edge 159 (Fig. 7) of the end portion 157 will press against one of the end walls of the opening and a clearance 160 will be formed between the opposite end wall 161 of the recess and the adjacent surface of the end portion 157.

The cam disc 155 is in contact with a roller 162 carried by a punch holder 163. A setting punch 164 is connected with one end of the holder 163 while the other end of the holder is in contact with a spring 165. The spring 165 keeps the roller 162 pressed against the cam disc 155 so that the punch holder 163 follows the cam surface 156.

When the roller 162 comes in contact with the sharp incline of the cam surface, the punch holder 163 is thrust downward through the action of the spring 165. At the same time, the roller 162 will press against the cam disc 155 and, due to the provision of the clearance 160, the cam disc 155, will yield to this pressure and will move somewhat with respect to the shaft 154. Due to this arrangement, the punch holder 163 will move with full force downward and this force will not be diminished by the counter pressure of the cam disc 155.

A nut 170 is situated above the spring 165 and may be used for adjusting the tension of said spring.

Due to the shape of the cam disc 155 and the end portion 157 of the shaft 154, the punch 164 strikes hard hammer-like blows against the saw 78.

A die or anvil 171 is situated under the punch 164 and is carried by a stand 172 supported by the housing 173. The operative surfaces of the punch 164 and the die 171 must correspond to the desired position and form of the saw teeth.

A second punch holder 174 is similar to the one just described and is used for setting simultaneously the second one of a pair of teeth. The punch holder 174 is driven by means of a cam disc 175 and a shaft 176 rotated by a wheel 177 which is rigidly connected with one end of the shaft 176. The wheel 177 meshes with a wheel 178, which is driven by a wheel 179. The wheel 179 is driven by a toothed wheel 150.

A pawl 199 is used to lock the setting device during the passing of those portions of the saw which have no teeth. The device is provided with a plunger pin 180 and a spring 181 situated in an annular chamber 182 formed between exterior circular walls of a casing 183 and inner walls of a projecting member 184 forming a part of the casing 183.

The spring 181 presses against a sliding head 185 which is movable within the casing 183 and which surrounds one end of a rod 188. The rod 188 carries a piston 186 situated within a chamber 187 formed by the walls of the sliding head 185.

The head 185 carries a roller 189 adapted to slide along the side surfaces of a cam disc 190 rotated by a shaft 191.

The shaft 191 is driven by the shaft 47 by means of a toothed sleeve 192 keyed upon the shaft 47 and meshing with a toothed wheel 193 keyed upon the shaft 194 which is carried by a bearing 195 forming a part of the casing 45; a bevel wheel 196 which is rotatable along with the shaft 194, meshes with a bevel wheel 197 which is firmly connected with the shaft 191.

Due to this arrangement the spring 181 can push the head 185 together with the pin 180 to the right (looking in the direction of Fig. 6) when the roller 189 comes in contact with the cut-out part of the cam 190. In this case the tapered end 198 of the pin 180 will project into the space between two teeth of the saw 78 while the head 185 will pull the piston 186 and the rod 188 connected with the piston 186 to the right (looking in the direction of Figure 6); since the pawl 199 is firmly connected with the rod 188, the head 185 will prevent the pawl 199 from penetrating into one of the notches 200 of the wheel 201 which is carried by a sleeve 202 surrounding the shaft 93a.

If, however, the tapered end 198 of the pin 180 does not meet the teeth of a saw, but instead of that comes in contact with straight edge portions of the saw, the sliding head 185 is prevented from moving all the distance to the right, so that the spring 203 which surrounds the rod 188 will push the pawl 199 into one of the notches 200 as soon as a notch comes in front of the pawl. Then the wheel 201 is locked, so that the wheel 150 connected with the wheel 201 is also locked.

The pawl 199, while moving into one of the notches 200 at the same time releases a clutch which is not shown in the drawings and which is adapted to connect operatively the shaft 93a with the wheel 150, said clutch being similar in construction to the clutch 139, shown in Fig. 5. Due to this arrangement the wheel 150 is locked while the shaft 93a continues to rotate.

The setting device 43 is released after the straight edge portions of the saw have passed beyond the pin 180, and when a gap between two saw-teeth is again situated in front of said pin; then the spring 181 will be able to push the head 185 further to the right (looking in the direction of Fig. 6) and the head 185 will push the tapered end 198 of the pin 180 into the gap between two saw teeth.

Due to this forward motion, the head 185 will pull the pawl 199 out of a notch 200 and at the same time the pawl 199 will move out of contact with the clutch, which will automatically establish an operative connection between the wheels 150 and 201 and the rotating shaft 93a; the wheels 150 and 201 will begin to rotate along with the shaft 93, driving the shafts 154 and 176 and the setting punches 164 and 174.

As shown in Fig. 2, the lever 31, the toothed wheel 27 and the support 28 impart an intermittent feeding motion to the saw 78. The saw 78 is moved forward while the pawl 74 pushes the teeth 76 of the wheel 27, and it remains stationary while the pawl 74 slides backwards over the teeth 76. The pin 180 shown in Figure 6 is also moved intermittently by means of the cam 190.

The cam 190 is rotated at a constant speed by the shaft 191 which is driven by the main shaft 47 through the medium of the toothed sleeve 192, the gear 193, the shaft 194 and the bevel wheels 196 and 197.

The cam 190 is of such shape that it moves the roller 189 and the head 185 from right to left (looking in the direction of Fig. 6) while the saw 78 is moved through the machine, thus maintaining the pin 180 out of contact with the teeth of the saw 78.

Those surfaces of the cam 190 which are in contact with the roller 189 are so shaped, that they permit the spring 181 to move the head 185 in the opposite direction as soon as the feeding movement of the saw 78 is interrupted, in order that the end 198 of the pin 180 may be inserted into the space between two adjacent teeth of the saw 78. The intermittent reciprocating movement of the head 185 caused by the cam 190 and the spring 181, and the intermittent rotary movement of the support 28 caused by the pawl 74 (Figs. 1 and 2) are, therefore, adjusted in such a way that the head 185 remains stationary in its extreme right-hand position (looking in the direction of Fig. 6) while the saw 78 is stationary, and that the head 185 is moved from right to left just before the feed motion of the saw 78 is resumed.

Obviously, the reciprocating motion of the pin 180 caused by the cam 190 is necessary to permit the intermittent feeding movement of the saw 78, since the pin 180 must be withdrawn from the space between two adjacent teeth before the saw 78 can be moved. During the greater part of the reciprocatory motion of the pin 180 the pawl 199 is situated in one of the notches 200, thus locking the punch holders 163 and 174. The pawl 199 is pulled out of the notch 200 and the punch holders 163 and 174 are permitted to operate only when the pin 180 is in or near its extreme right-hand position and its end 198 is projecting between the teeth of the saw 78, since in that position the saw 78 is at rest and no straight edge portions of the saw are situated under the punch holder 163.

The shaft 93a is driven at a constant speed by the shaft 194 which is connected with a bevel wheel 205 meshing with a bevel wheel 206 which is connected with one end of a vertical shaft 207. A coupling 208 connects the shaft 207 with a shaft 209 the opposite end of which is provided with a bevel wheel 210 meshing with a bevel wheel 211 which is attached to the shaft 93a.

The sharpening device 44 is shown in section in Figure 8 of the drawings. Means for locking this device are similar to those used for locking the setting device 43 and comprise a wheel 220 provided with notches 221 and carried by a sleeve 222 which surrounds a shaft 223. The wheel 220 may be locked by a pawl 224 rigidly connected with one end of a rod 225, the opposite end of which carries a piston 226. A coiled spring 227 surrounds the rod 225 and is surrounded by the walls of a projection 228 forming a part of a casing 229. A coiled spring 230 is situated within the casing 229 and is adapted to press against a sliding head 231 which carries a pin 232.

The head 231 also carries a roller 233 which is in contact with the surfaces of a cam disc 234 rotated by a vertical shaft 235. The shaft 235 is driven by the main shaft 50 which carries a toothed sleeve 236 meshing with a toothed wheel 237 keyed upon a shaft 238. The shaft 238 is carried by a bearing 239 which constitutes a part of the casing 49.

A bevel wheel 240 which is carried by one end of the shaft 235, is in engagement with a bevel wheel 241 keyed upon one end of the vertical shaft 235. The opposite end of the shaft 238 carries a bevel wheel 242 which meshes with a bevel wheel 243 rotatable along with a vertical shaft 244. The shaft 244 is connected with a vertical shaft 246 by means of a coupling 245. A bevel wheel 247 driven by the shaft 246, drives the bevel wheel 248 which is keyed upon the shaft 223. Due to this arrangement, the shaft 223 is driven by the main shaft 50 through the medium of the gear wheels 236 and 237, the shaft 238, the bevel wheels 242 and 243, the shaft 244, the coupling 245, the shaft 246 and the bevel wheels 247 and 248.

The shaft 223 carries a gear wheel 249 which is rotatable along with the shaft 223 and which engages a gear wheel 250 and a gear wheel 251. The wheel 250 is keyed to a crank shaft 252 which drives a connecting rod 253 by means of a crank 254.

The wheel 251 meshes with a gear wheel 255 keyed to a crank shaft 256 and driving a connecting rod 258 by means of a crank 257. The connecting rods 253 and 258 are guided in slides 259 and 260, respectively, which form a part of the casing 49. A grinding disc 261 is mounted on a flexible shaft 262 which is carried by the rod 253. A similar grinding disc 263 is mounted upon a flexible shaft 264 carried by the rod 258.

The reciprocating movement of the grinding discs 261 and 263, which is caused by the rotation of the wheel 249 driving the connecting rods 253 and 258, is used for the sharpening of the teeth of the saw 78. The flexible shafts 262 and 264 are rotated at a constant speed by a driving mechanism not shown in the drawings.

Means for locking the sharpening device 44 are substantially similar to means for locking the setting devices, and comprise the pawl 224 which is adapted to come in contact with the adjacent end of a lever 265 carrying a clutch not shown in the drawings. The lever 265 is attached by a pivot 266 to the casing 49. When the pawl 224 is situated in one of the notches 221, it moves the lever 265 against the action of a spring (not shown) disengaging the clutch and interrupting a connection between the wheel 220 and the shaft 223. The wheel 220 is keyed upon the sleeve 222 slidably mounted on the shaft 223. The wheel 249 is also keyed to the sleeve 222.

Due to this arrangement the saw 78 is locked while its teeth are being sharpened by the discs 261 and 263, and the wheel 249 is locked while the saw 78 is moved by the pawl 74.

What is claimed is:

1. In combination, a central support for a circular saw, a toothed wheel connected with said support, means meshing with teeth of said wheel for intermittently rotating the same, whereby said circular saw is rotated, radial tracks connected with said central support, movable cutting, setting and sharpening devices carried by said tracks, said cutting, setting and sharpening devices being adjustable along said tracks, and means for adjusting said radial tracks on which said setting and sharpening devices are mounted relatively to said radial track on which said cutting device is mounted.

2. In combination, a central support for a circular saw, means connected with said central support for intermittently rotating the same, a plurality of tracks extending radially in relation to said support, tooth-treating means carried by said tracks for treating the teeth of said saw, adjusting means connected with said tracks and said tooth-treating means for adjusting the position of said tooth-treating means upon said tracks, and means connected with said tracks for moving the same around said central support.

3. In combination, a central support for a circular saw, means connected with said central support for intermittently rotating the same, a plurality of tracks extending radially in relation to said support, a cutting device, a setting device, a sharpening device, each of said cutting, setting and sharpening devices being carried by a separate track and being movable upon the same, and means connected with the tracks carrying said setting and sharpening devices for moving the same around said central support and relatively to said cutting device.

4. In combination, a vertical spindle, a support for a circular saw, said support being rotatably mounted upon said spindle, means connected with said support for intermittently rotating the same, a plurality of tracks extending radially in relation to said support each having one end surrounding said spindle, a curved guide carrying the opposite end of said radial tracks, means connected with said tracks for moving the same relatively to said curved guide, and tooth-treating means for treating the teeth of a saw, said tooth-treating means being adjustably mounted upon said tracks.

5. In combination, a vertical spindle, a support for a circular saw, said support being rotatably mounted upon said spindle, a toothed wheel carried by said spindle and rotatable along with said support, a lever oscillatably mounted upon said spindle, means connected with said lever for oscillating the same, a pawl carried by said lever and adapted to engage the teeth of said wheel, a plurality of tracks extending radially in relation to said support each having one end surrounding said spindle, a curved guide carrying the opposite end of said radial tracks, means connected with said tracks for moving the same relatively to said curved guide, and tooth-treating means for treating the teeth of a saw, the said tooth-treating means being adjustably mounted upon said tracks.

6. In combination, a vertical spindle, a support for a circular saw, said support being rotatably mounted upon said spindle, a toothed wheel carried by said spindle and rotatable along with said support, a lever oscillatably mounted upon said spindle, a link having one end pivotally connected with said lever, a disc, means for rotating said disc, the opposite end of said link being pivotally and adjustably mounted upon said disc, a pawl carried by said lever and adapted to engage the teeth of said wheel, a plurality of tracks extending radially in relation to said support each having one end surrounding said spindle, a curved guide carrying the opposite end of said radial tracks, means connected with said tracks for moving the same relatively to said curved guide, and tooth-treating means for treating the teeth of a saw, said tooth-treating means being adjustably mounted upon said tracks.

7. In combination, a vertical spindle, a support for a circular saw, said support being rotatably mounted upon said spindle, a toothed wheel carried by said spindle and rotatable along with said support, a lever oscillatably mounted upon said spindle, a link having one end pivotally connected with said lever, a disc, a motor, means connected with said disc and said motor for rotating said disc, the opposite end of said link being pivotally and adjustably mounted upon said disc, a pawl carried by said lever and adapted to engage the teeth of said wheel, a plurality of tracks extending radially in relation to said support each having one end surrounding said spindle, a curved guide carrying the opposite end of said radial track, means connected with said tracks for moving the same relatively to said curved guide, tooth-treating means for treating the teeth of a saw, said tooth-treating means being adjustably mounted upon said tracks, a main shaft carried by said radial tracks and connected with said tooth-treating means, a gear wheel carried by one end of said main shaft, another toothed wheel surrounding said spindle and engaging said gear wheel, and means connected with said motor and the last-mentioned toothed wheel for driving the same.

8. In combination, a hollow support, a vertical spindle within said support, another support for a circular saw, the last-mentioned support being rotatably mounted upon said spindle, a web rigidly connected with the first-mentioned support, a curved guide rigidly connected with said web, a plurality of tracks extending radially in relation to said support each having one end surrounding said spindle, the opposite end of said radial tracks being carried by said curved guide, tooth-treating means for treating the teeth of a saw, said tooth-treating means being adjustably mounted upon said tracks, a main shaft carried by said radial tracks and connected with said tooth-treating means, a gear wheel carried by one end of said main shaft, a toothed wheel carried by said spindle and rotatable along with the second-mentioned support, a lever oscillatably mounted upon said spindle, a link having one end pivotally connected with said lever, a disc, the opposite end of said link being pivotally and adjustably mounted upon said disc, a pawl carried by said lever and adapted to engage the teeth of said toothed wheel, another toothed wheel surrounding said spindle and engaging said gear wheel, a motor, means connected with said disc and said motor for rotating said disc, and separate means connected with said motor and the last-mentioned toothed wheel for rotating the latter.

9. In combination, a hollow support, a vertical spindle within said support, another support for a circular saw, the last-mentioned support being rotatably mounted upon said spindle, a web rigidly connected with the first-mentioned support, a curved guide rigidly connected with said web, a plurality of tracks extending radially in relation to said support each having one end surrounding said spindle, the opposite end of said radial tracks being carried by said curved guide, tooth-treating means for treating the teeth of a saw, said tooth-treating means being adjustably mounted upon said tracks, said curved guide having teeth formed therein, a gear wheel connected with said tracks and having teeth engaging the teeth of said curved guide, a main shaft carried by said radial tracks and connected with said tooth-treating means, another gear wheel carried by one end of said main shaft, a toothed wheel carried by said spindle and rotatable along with the second-mentioned support, a lever oscillatably mounted upon said spindle, a link having one end pivotally connected with said lever, a disc, the opposite end of said link being pivotally and adjustably mounted upon said disc, a pawl carried by said lever and adapted to engage the teeth of said toothed wheel, another toothed wheel surrounding said spindle and engaging the second-mentioned gear wheel, a motor, means connected with said disc and said motor for rotating said disc, and separate means connected with said motor and the last-mentioned toothed wheel for rotating the latter.

10. The combination with a saw support having a transversely extending spindle and means for intermittently rotating said support in said spindle, of an annular guide, a plurality of tracks extending radially in relation to said spindle and each having one end surrounding said spindle, the opposite end being mounted on said annular guide, said tracks being adjustable relative to each other, and tooth treating means individually and adjustably mounted on said tracks.

11. In combination, a central support for a circular saw, means connected with said central support for intermittently rotating the same, a track extending radially in relation to said support, means for treating the teeth of said saw, the second-mentioned means being carried by said track, means connected with said track and the second-mentioned means for adjusting the position of the second-mentioned means upon said track, means connected with said track for moving the same around the central support, a second stationary track and tooth treating means carried by said stationary track.

ERICH POEGGEL.